Sept. 26, 1933.   N. A. WAHLBERG   1,927,906

POLE HEAD FOR TRACKLESS TROLLEYS

Filed Nov. 26, 1930

WITNESSES

INVENTOR
Nils A. Wahlberg
BY
ATTORNEY

Patented Sept. 26, 1933

1,927,906

UNITED STATES PATENT OFFICE 1,927,906

POLE HEAD FOR TRACKLESS TROLLEYS

Nils A. Wahlberg, Wilkinsburg, Pa., assignor to Westinghouse Electric & Manufacturing Company, a corporation of Pennsylvania Application November 26, 1930
Serial No. 498,413

16 Claims. (Cl. 191—64)

My invention relates to improvements in trolley poles and more particularly to trolley poles suitable for use on trackless-trolley vehicles.

In the operation of electrically propelled vehicles commonly known as trackless-trolley busses, which are mounted on wheels having rubber tires, it is necessary to provide two overhead conductors for conducting current to the motors of the vehicles. One of the conductors is connected to the positive side of the power source and the other conductor is connected to the negative side. It is therefore necessary to provide the vehicles with two current collecting devices which must be insulated from the trolley poles on which they are mounted.

An object of my invention, generally stated, is to provide a trolley pole which shall be simple and reliable in operation and which may be readily and economically manufactured.

A more specific object of my invention is to provide for insulating a trolley pole from a trolley harp.

Another object of my invention is to provide for retaining a pole head in a fixed position on a trolley pole.

A further object of my invention is to prevent vibration from being transmitted from a trolley head to a trolley car body.

It is also an object of my invention to prevent the insulating material, provided on a trolley pole to insulate it from the trolley harp, from being injured by coming in contact with a trolley conductor or its supporting wires.

Other objects of the invention will be explained fully hereinafter, or will be apparent to those skilled in the art.

For a fuller understanding of the nature and scope of the invention, reference may be had to the following detailed description, taken in conjunction with the accompanying drawing in which.

Figure 1:
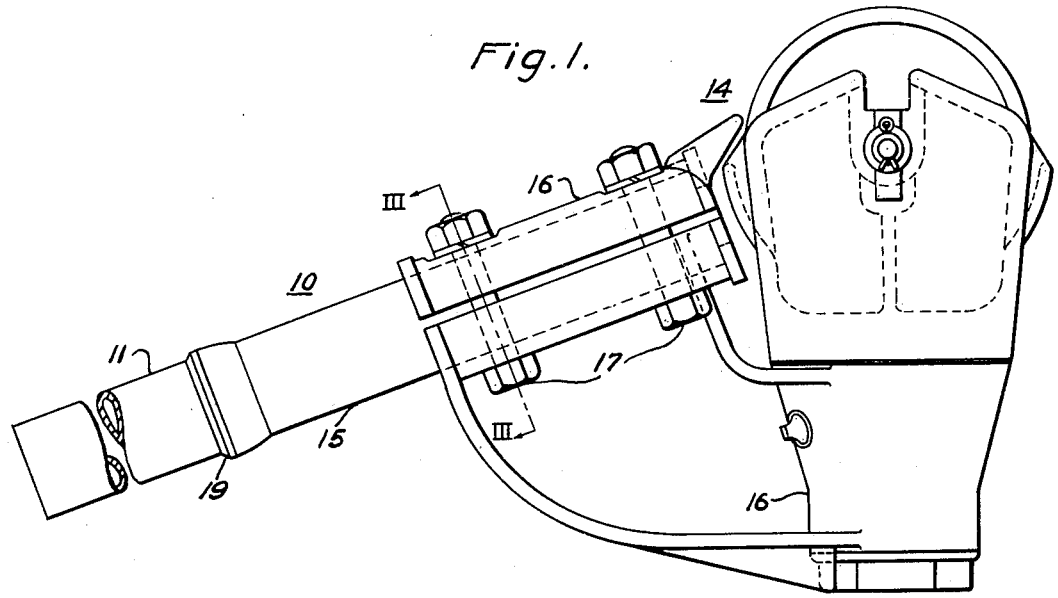
Figure 1 is a view in side elevation, of a trolley pole head mounted on an insulated trolley pole extension, which is constructed in accordance with my invention.
Figure 2:
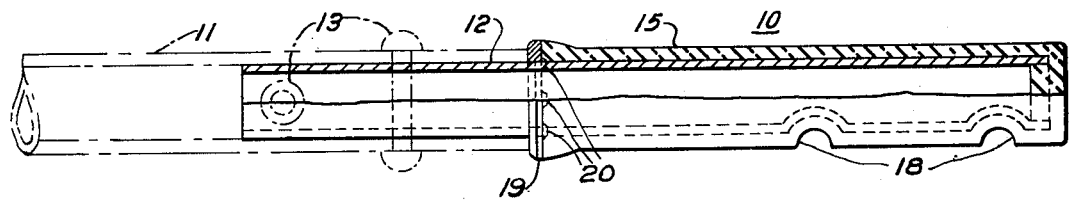
Fig. 2 is a view, partly in elevation and partly in section, of the insulated pole extension.
Figure 3:
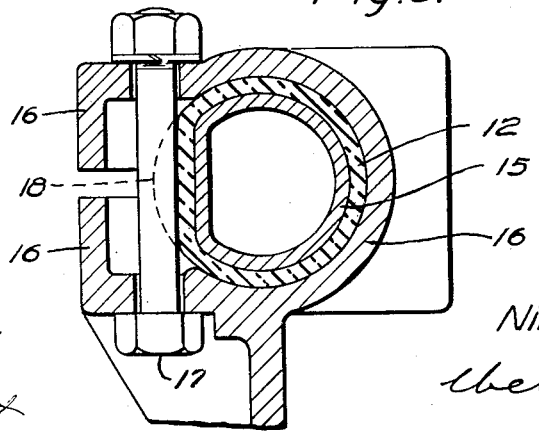
Fig. 3 is an enlarged sectional view, taken along the line III—III of Fig. 1, showing the method of retaining the pole head on the insulated extension.

A preferred embodiment of the invention is illustrated in the drawing in which 10 designates an extension member disposed to be attached to the end of a trolley pole 11. The extension 10 comprises a cylindrical tube 12 having an end portion disposed to telescope in the end of the trolley pole 11. The tube 12 may be securely held in the pole by means of bolts or rivets 13.

In order that the trolley pole 11 shall be insulated from a current collecting device 14, which is supported on the pole 11, the portion of the tube 12 which projects beyond the pole is covered with a layer of insulating material 15. The insulating material 15 may be vulcanized or molded on the tube 12 in such a manner that it will not become loose.

It is necessary that the insulating layer 15 be composed of a material having sufficient resiliency to prevent the vibration of the current collector 14 from being transmitted, through the trolley pole 11, to the body of the vehicle, thereby preventing undesirable noise from being transmitted to the vehicle body. It is also necessary that the insulating material have sufficient body or strength to permit the current collector 14 to be rigidly mounted on the extension member 10.

As illustrated, the current collector 14 may be mounted on the trolley pole 11 by means of a pole head 16 which is clamped around the pole extension 10. The pole head 16 may be held in position on the insulated extension 10 by bolts 17, which are disposed to cause the pole head 16 to be firmly clamped around the insulating material 15, interposed between the tube 12 and the pole head 16.

With a view to preventing the pole head 16 from turning on the insulated extension 10, transverse grooves 18 are provided in one side of the extension member 10. The grooves 18 are disposed to receive the bolts 17 when the extension 10 is inserted in the pole head 16. It will be seen that the pole head cannot turn on the tube 12 and cannot be pulled from the tube when the bolts 17 are inserted in the grooves 18 to clamp the pole head around the extension 10.

In order to prevent the insulating material 15 from being injured and peeled from the tube 12, when the current collector 14 becomes disengaged from the trolley conductor and the trolley pole strikes the cross span wires, a washer 19 is interposed between the ends of the trolley pole 11 and the insulating material 15. It will be noticed that the edge of the washer 19, adjacent to the end of the pole 11, is beveled, to prevent the insulating material 15 from being injured by the supporting wires for the trolley conductor. If desired, the washer 19 may be secured to the tube 12 by welding it at several places 20 about the circumference of the tube.

If the insulating material becomes so badly injured that it is necessary to replace it, this may be readily accomplished by replacing the extension member 10 with a new one. The extension 10 may be removed from the trolley pole 11 by removing the rivets 13. A new extension may then be inserted in the pole and riveted in place.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An insulated extension for a trolley pole comprising a cylindrical tube having one portion adapted to telescope in the end of the trolley pole, one side of the projecting portion of the tube being provided with a transverse groove, and a layer of insulating material disposed to cover the exterior surface of the projecting portion of the tube.

2. In a current collector for electric vehicles, in combination, a trolley pole, an extension member secured to the end of the trolley pole, a pole head adapted to be mounted on the extension member, means for clamping the pole head on the extension, said extension being provided with a transverse groove for cooperating with the clamping means to prevent the pole head from turning on the extension, and a layer of insulating material interposed between the extension and the pole head.

3. In a current collector for electric vehicles, in combination, a trolley pole having one side provided with a transverse groove near one end thereof, a pole head adapted to be mounted on the pole at the grooved end, a layer of insulating material disposed between the trolley pole and the pole head and in the transverse groove, and means for clamping the pole head in operative position on the trolley pole.

4. In a current collector for electric vehicles, in combination, a trolley pole, a layer of insulating material disposed around one end of the trolley pole, one side of the layer of insulating material being provided with a transverse groove, a pole head adapted to be mounted on the trolley pole at the insulated end, and clamping means disposed in said groove for securing the pole head in operative position on the trolley pole.

5. In a current collector for electric vehicles, in combination, a trolley pole provided with a transverse groove on one side near the end thereof, a layer of insulating material disposed around the grooved end of the trolley pole and in said transverse groove, one side of the layer of insulating material being provided with a transverse groove, a pole head adapted to be mounted on the insulated end of the trolley pole, and clamping means disposed in said groove in the insulating material for securing the pole head in operative position on the trolley pole.

6. In a current collector for electric vehicles, in combination, a trolley pole provided with a transverse groove on one side near the end thereof, a layer of insulating material disposed around the grooved end of the trolley pole and in said transverse groove, one side of the layer of insulating material being provided with a transverse groove conforming to the portion of the insulating material disposed in the transverse groove in the trolley pole, a pole head adapted to be mounted on the insulated end of the trolley pole, and clamping means disposed in said groove in the insulating material for securing the pole head in operative position on the trolley pole.

7. In a current collector for electric vehicles, in combination, a trolley pole provided with a transverse groove on one side near the end thereof, a rubber sleeve vulcanized to the grooved end of the trolley pole and filling said transverse groove, one side of the rubber sleeve being provided with a transverse groove conforming to the portion of the sleeve engaging the transverse groove in the trolley pole, a pole head adapted to be mounted on the rubber sleeve, and clamping means disposed in said groove in the rubber sleeve for securing the pole head in operative position on the trolley pole.

8. In a current collector for electric vehicles, in combination, a trolley pole, an extension member having one portion adapted to be secured to the end of the trolley pole, one side of the projecting portion of the extension member being provided with a transverse groove, a pole head adapted to be mounted on said projecting portion, a layer of insulating material disposed between the extension member and the pole head and in the transverse groove, and means for clamping the pole head in operative position on the extension member.

9. In a current collector for electric vehicles, in combination, a trolley pole, an extension member having one portion adapted to be secured to the end of the trolley pole, a layer of insulating material disposed around the projecting portion of the extension member, one side of the layer of insulating material being provided with a transverse groove, a pole head adapted to be mounted on said projecting portion, and clamping means disposed in said groove for securing the pole head in operative position on the extension member.

10. In a current collector for electric vehicles, in combination, a trolley pole, an extension member having one portion adapted to be secured to the end of the trolley pole, one side of the projecting portion of the extension member being provided with a transverse groove, a layer of insulating material disposed around the projecting portion of the extension member and in said transverse groove, one side of the layer of insulating material being provided with a transverse groove, a pole head adapted to be mounted on said projecting portion, and clamping means disposed in said groove in the insulating material for securing the pole head in operative position on the extension member.

11. In a current collector for electric vehicles, in combination, a trolley pole, an extension member having one portion adapted to be secured to the end of the trolley pole, one side of the projecting portion of the extension member being provided with a transverse groove, a layer of insulating material disposed around the projecting portion of the extension member and in said transverse groove, one side of the layer of insulating material being provided with a transverse groove conforming to the portion of the insulating material disposed in the transverse groove in the trolley pole, a pole head adapted to be mounted on said projecting portion, and clamping means disposed in said groove in the insulating material for securing the pole head in operative position on the extension member.

12. In a current collector for electric vehicles, in combination, a trolley pole, an extension member having one portion adapted to be secured to the end of the trolley pole, one side of the projecting portion of the extension member being provided with a transverse groove, a rubber sleeve vulcanized to the projecting portion of the extension member and filling said transverse groove, one side of the rubber sleeve being provided with a transverse groove conforming to the portion of the sleeve engaging the transverse groove in the extension member, a pole head adapted to be mounted on said projecting portion, and clamping means disposed in said groove in the rubber sleeve for securing the pole head in operative position on the extension member.

13. An insulating sleeve for supporting and insulating a current collector from a trolley pole comprising a tubular member composed of soft rubber, and an inwardly-projecting transversely-extending rib formed integral with the member to engage a corresponding groove in the trolley pole.

14. An insulating sleeve for supporting and insulating a current collector from a trolley pole comprising a tubular member composed of soft rubber closed at one end and having the other end thickened to resist excessive wear, said tubular member being provided with a transversely-extending groove to provide for engagement with a corresponding rib on the current collector and an inwardly-projecting transversely-extending rib formed integral therewith to engage a corresponding groove in the trolley pole.

15. In a device for collecting current from a trolley conductor for an electric vehicle, in combination, a trolley pole disposed to be carried by the vehicle, a current collector disposed to engage the conductor and to be carried by the pole, and removable insulating means interposed between the pole and the collector, said collector and insulating means being provided with mutually-engaging transversely-extending ribs and grooves to prevent relative longitudinal and rotative movement of the collector with respect to the pole.

16. A device for collecting current from a trolley conductor for an electric vehicle comprising, in combination, a trolley pole disposed to be carried by the vehicle, an insulating member detachably secured to the pole, said insulating member being provided with a plurality of transversely-extending grooves, and a current collector provided with a contact member for engaging the conductor and a support member disposed to be mounted on the insulating member, said support member being provided with a plurality of removable transversely-extending holding members disposed to engage the grooves in the insulating member to prevent relative longitudinal and rotative movement of the current collector with respect to the pole.

NILS A. WAHLBERG.